Figure 4:
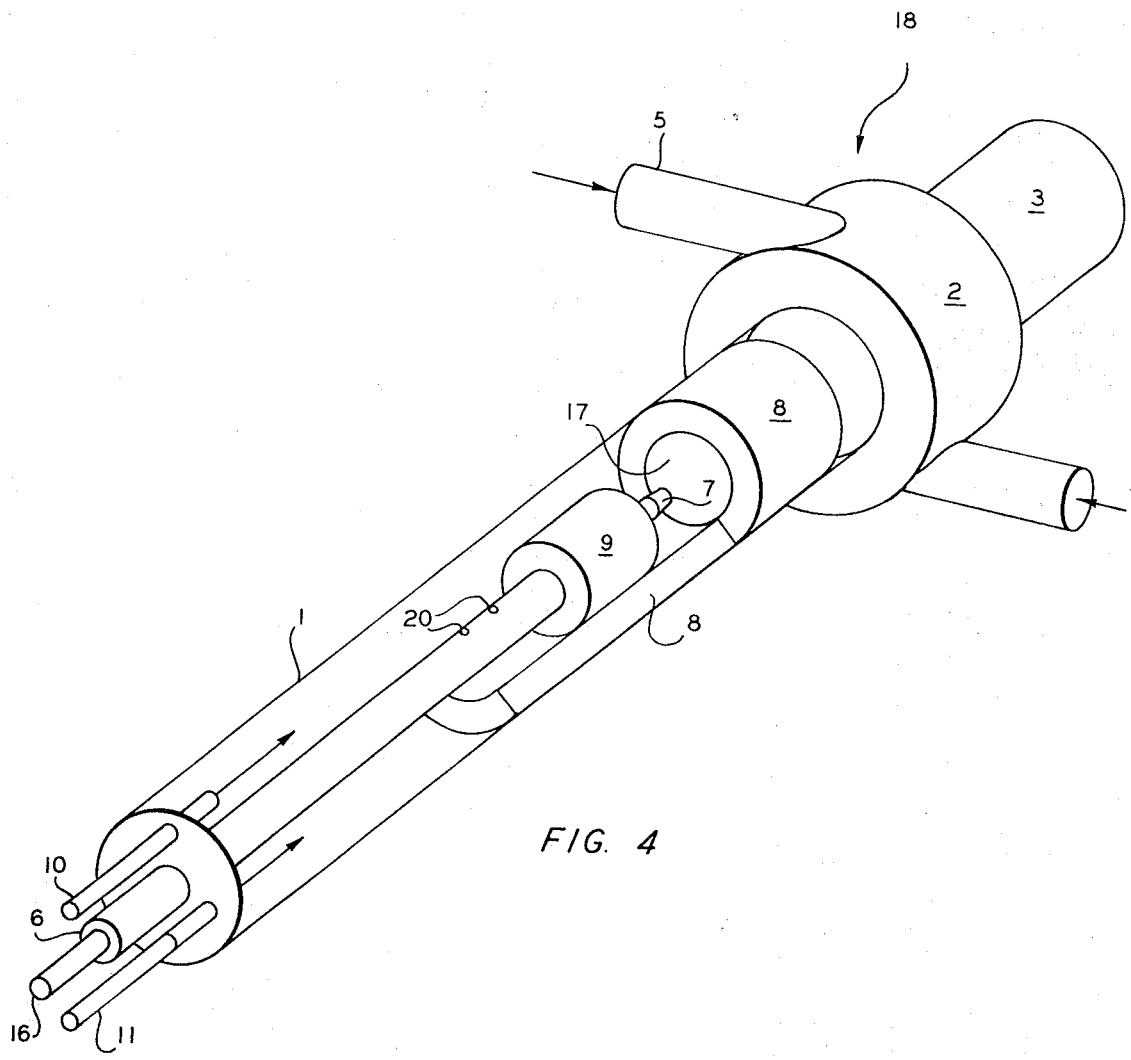

United States Patent

Henderson

[15] 3,660,039
[45] May 2, 1972

[54] CARBON BLACK REACTOR WITH POSITIONABLE CHOKE

[72] Inventor: Eulas W. Henderson, Toledo, Ohio
[73] Assignee: Phillips Petroleum Company
[22] Filed: Sept. 11, 1970
[21] Appl. No.: 71,471

Related U.S. Application Data

[63] Continuation-in-part of Ser. No. 769,283, Oct. 21, 1968, abandoned.

[52] U.S. Cl.............................23/259.5, 23/277, 23/209.4, 431/186, 431/189, 431/357, 431/353
[51] Int. Cl.......................................C09c 1/48, F23d 15/00
[58] Field of Search..............23/259.5, 209.4, 277; 431/186, 431/189, 351, 353

[56] References Cited

UNITED STATES PATENTS

| | | | |
|---|---|---|---|
| 1,797,570 | 3/1931 | Ferguson | 431/188 X |
| 3,060,003 | 10/1962 | Williams | 23/259.5 X |
| 3,567,395 | 3/1971 | Henderson et al. | 23/259.5 |

*Primary Examiner*—James H. Tayman, Jr.
*Attorney*—Young and Quigg

[57] ABSTRACT

Apparatus for producing carbon black in which a plug choke is variably positionable along the length of the first reaction section to vary its length or, at the extreme position of the choke, to eliminate the first section.

5 Claims, 4 Drawing Figures

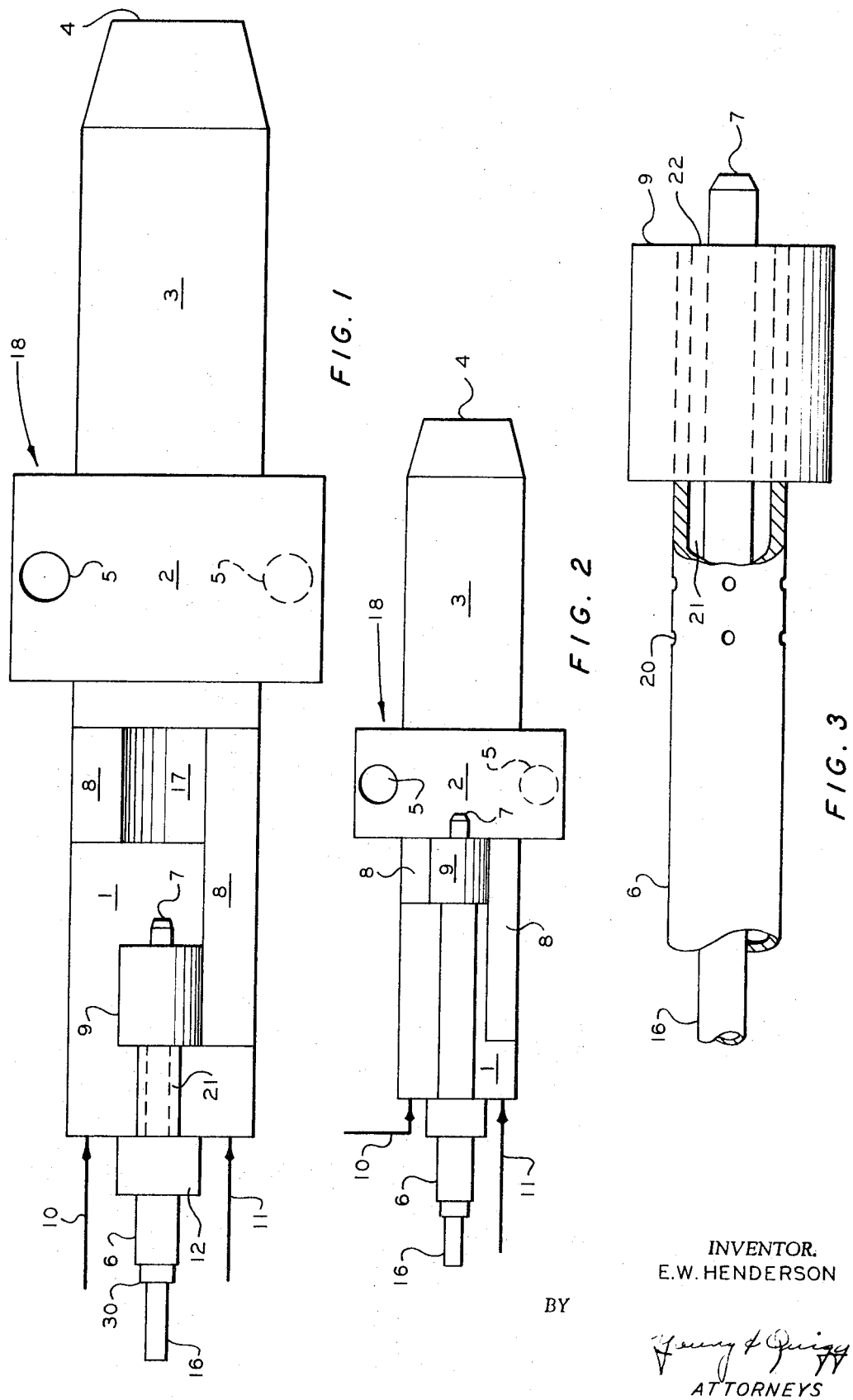

3,660,039

CARBON BLACK REACTOR WITH POSITIONABLE CHOKE

This is a continuation-in-part of copending application, Ser. No. 769,283 filed Oct. 21, 1968 and now abandoned.

This invention relates to carbon black.

In one of its specific aspects, this invention relates to the production of various type carbon blacks in a single reactor.

Carbon black can be produced in a horizontal reactor having a plurality of horizontal reaction sections in contiguous relationship. There are two principal types of horizontal reactors. One is referred to as a conventional type reactor and has two sections, the first section being the precombustion section into which feed is introduced, the second section being that section in which a principal portion of the carbon black is considered as being formed. The second reactor is the axial reactor in which an axial section precedes the precombustion section and a principal portion of the feed is introduced into this axial section.

Generally, carbon blacks which can be produced in the conventional reactor cannot be produced in the axial reactor, and conversely, carbon blacks which can be made in the axial reactor cannot be made in the conventional reactor. Accordingly, a method of converting one type of reactor into the other type reactor, thereby extending the variety of carbon blacks producible within any one reactor, is desirable.

Generally, normal structure carbon blacks are producible in the conventional type reactor with high structure blacks being produced in the axial reactor. Accordingly, a reactor which would be the combination of the two would allow the production of both normal and high structure blacks.

According to this invention, there is provided a reactor having a multiplicity of reaction sections in contiguous, axial alignment, the first section having a decreased diameter proximate the entrance to the second reaction section, a variably position nozzle assembly supporting a plug being adapted for positioning within the section of decreased diameter so as to limit flow from the first reaction section into the second reaction section, the variably position nozzle assembly being adaptable to discharge into the second reaction section.

The apparatus of this invention will be more easily understood when explained in conjunction with the attached drawings.

Referring now to FIG. 1 of the attached drawings, there is shown carbon black reactor 18 having axial section 1, precombustion section 2 and carbon formation section 3 from which carbon is recovered through nozzle outlet 4. Access is had to precombustion section 2 for fuel, air, and, optionally, some portion of the make-oil through entry ports 5 which may discharge radially or tangentially into the longitudinal axis of the reactor.

Axial section 1 is equipped with make-oil inlet conduit 16 adapted to discharge through nozzle 7, the conduit being adjustable along the length of section 1 by means of packing gland 30. Axial section 1 is also adapted for the inlet of some portion of the fuel and air through conduits 10 and 11 which can open into axial section 1 or which can discharge thereinto through nozzles (not shown) affixed to the ends of conduits 10 and 11 and positioned to discharge into axial section 1.

It will be noted from FIG. 1 that make-oil inlet conduit 16, adapted with nozzle 7, is slideably positioned within sleeve 6 by means of packing gland 30, and that sleeve 6 is suitably bushed by means of bushing or packing gland 12 to allow independent positioning of both the sleeve and the make-oil inlet conduit. The interrelation of these parts will be hereinafter discussed in reference to FIG. 3.

Positioned within axial section 1 is choke 8 which conforms peripherally to the internal configuration of section 1 so as to fit snugly against the inner wall of section 1. Choke 8 has a centrally positioned bore 17 therethrough adapted for the sealable positioning therein of plug 9, plug 9 having an external configuration matching the internal configuration of bore 17. In its preferred form, a lower portion of choke 8 projects in the upstream direction of section 1 such that plug 9, which is carried on sleeve 6, can slide along the extended section of choke 8. With plug 9 retracted from choke 8, choke 8 forms a length of decreased diameter within section 1 and allows the operation of the carbon black reactor with an axial section into which the various reactants may be introduced. However, with plug 9 sealably positioned within choke 8, as shown in FIG. 2, flow of reactants, other than make-oil and some nozzle cooling fluid, from section 1 to section 2 is essentially eliminated. Axial section 1 therefore becomes ineffective and the hydrocarbon make-oil introduced through conduit 16 and through nozzle 7 discharges directly into precombustion section 2, and the reactor becomes a two-section reactor of the conventional precombustion type.

From the above, it will be seen that axial section 1 extends from the upstream wall of the reactor to the upstream wall of section 2 at which point the reactor enlarges in diameter. Relatedly, section 2 extends from its upstream wall at which point the diameter of the reactor decreases to form carbon formation section 3.

While choke 8 is illustrated as having a cylindrical bore, the bore can be of any suitable configuration, the configuration of plug 9 conforming therewith. Depending upon the configuration of these matching pieces, considerable variation can be effected in the character of the flow passing through bore 17 at various positions of plug 9.

Referring now to FIG. 3, there is shown the relationship between make-oil conduit 16 and sleeve 6.

Plug 9 is affixed to sleeve 6 and make-oil conduit 16 is positioned within sleeve 6 to form annulus 21 therebetween, annulus 21 opening around nozzle 7 through opening 22 peripheral to make-oil conduit 16. Both sleeve 6 and make-oil conduit 16 are independently positionable along the length of section 1 by adjustment through packing glands 12 and 30, respectively. Sleeve 6 has any suitable number of apertures 20 providing open communication between section 1 and annulus 21.

In the operation of the reactor, with plug 9 withdrawn from choke 8, air or other fluid introduced into the upstream end of section 1 will serve to keep nozzle 7 free of carbon deposition. However, with plug 9 seated within choke 8 and flow of air or other fluid from the upstream end of section 1 around nozzle 7, in effect, eliminated, apertures 20 allow flow of air or other fluid from section 1 into annulus 21 and out opening 22 surrounding nozzle 7 with the result that air or other fluid sweeps nozzle 7 minimizing carbon formation on nozzle 7.

The described combination of the independently positionable plug, independently positionable choke, and independently positionable nozzle provide variable points of discharge, variable discharge quantities and variable discharge rates of reactants from section 1 into section 2.

Accordingly, it is seen that the use of the apparatus of this invention, and with adjustment of other operational variables such as the make-oil temperature, reactant ratios, the oil nozzle position, the position of the plug along the length of choke 8, and position of choke 8 along section 1, a large number of carbon blacks are producible. Accordingly, this single reactor effectively individually produces all those carbon blacks producible by the axial and conventional reactors separately.

A perspective view of the reactor is shown in FIG. 4 in which bushings or packing glands 30 and 12 have been omitted for clarity.

Referring now to FIG. 4, it is seen that conduits 10 and 11 discharge by opening into section 1. The upstream extending section of choke 8 is shown supporting plug 9, plug 9 being movably positionable along the upstream-extending section of choke 8 by means of sleeve 6 on which plug 9 is carried, and being positionable in a downstream direction such that its downstream face coincides with the upstream wall of zone 2 at which position nozzle 7 discharges into zone 2. At this position, however, the plug is still positioned within choke 8 to an extent sufficient to prevent flow between the choke and the plug. It will be noted that those materials introduced into section 1 by means of conduits 10 and 11 can flow through apertures 20 into sleeve 6 so as to flow out of sleeve 6 downstream of plug 9 around nozzle 7. It will be seen that plug 9 can be inserted within bore 17 to eliminate carbon black formation in section 1 inasmuch as with the downstream edge of choke 8 positioned at or near the upstream wall of section 2, all hydrocarbon feed is introduced into section 2. Those materials introduced into section 1 by conduits 10 and 11 will flow downstream in section 1, through apertures 20 and into section 2 around nozzle 7. However, with plug 9 withdrawn from bore 17 of choke 8, a principal portion of that material introduced into section 1 by conduits 10 and 11 will flow into bore 17 without passing through apertures 20.

The operation of the reactor is indicated by runs tabulated below. One of these runs was made in a conventional reactor having no axial reaction and one was made in an axial reactor. While the conventional reactor and the axial reactor were of different sizes, the runs nevertheless indicate that under comparable conditions a wide variety of blacks is producible by the apparatus of this invention.

These data are as follows:

|  | Conventional 10″ reactor (control) [a] | 15″ axial×10″; 4″ I.D. choke at 10″ [b] | | | |
|---|---|---|---|---|---|
|  | | Normal structure black, plug flush w/choke outlet | | High structure black | |
| Run number | 1 | 2 | 3 | Plug pulled back from choke 4 | Choke but no plug in system 5 |
| Oil, g.p.h | 397 | 341 | 359 | 348 | 348 |
| Oil tube position, in | 0 | 0 | 0 | 10 | 10 |
| Tang. air, m.s.c.f./h | 225 | 206 | 206 | 175 | 175 |
| Tang. gas, m.s.c.f./h | 15 | 13.67 | 13.67 | 13.2 | 13.3 |
| Axial air, m.s.c.f./h | 4 | 4 | 4 | 35 | 35 |
| Air/oil, s.c.f./gal | 577 | 607 | 585 | 603 | 603 |
| Photelometer | 91 | 87 | 90 | 90 | 90 |
| Yield, #C/gal | 5.18 | 5.02 | 4.99 | 4.76 | 4.76 |
| $N_2SA$, m.²/gm | 85 | 93 | 85 | 87 | 83 |
| DBP, cc./100 gm | 138 | 137 | 132 | 142 | 150 |
| Conversion, percent | 55 | 53 | 53 | 51 | 51 |

[a] Reaction section 10″ diameter.
[b] Reaction section 10″ diameter; axial section is 15″ diameter with choke therein having 4″ diameter bore, the downstream end of the choke being 10″ upstream from inlet of precombustion zone.

Run No. 1 was made in a conventional reactor, there being no choke in the reactor and the oil tube nozzle being positioned to discharge at the point of inlet to section 2 or the precombustion section.

Runs No. 2 and 3 were made in an axial reactor in which a choke was positioned within the axial section 1, the downstream face of the choke being 10 inches upstream from the inlet to precombustion section 2, the downstream face of the plug being flush with the downstream face of the choke, the oil tube extending through the plug such that its outlet was flush with the inlet to the precombustion section, that is 0 inches upstream from the entrance into the precombustion section.

Run No. 4 was made in an axial reactor with the choke being positioned within the axial section 1, the downstream face of the choke being 10 inches upstream from the inlet to precombustion section 2, the plug being withdrawn from the choke into the upstream end of the axial section so as to minimize its effect, the oil tube nozzle being positioned to discharge 10 inches upstream of the inlet to the precombustion section.

Run. No. 5, the counterpart of Run No. 1, was made in an axial reactor, the choke being positioned within the axial section, the downstream face of the choke being 10 inches upstream from the inlet to the precombustion section 2, the plug having been removed from the axial section, the oil tube nozzle being positioned to discharge 10 inches upstream of the inlet to the precombustion section.

A comparison of Runs 1 and 5 indicates that the axial reactor with the choke present produces a higher structure carbon black than that produced in the conventional reactor.

The data of Runs 2 and 3 indicates a reduction in the structure of the black produced in comparison to that produced either in the conventional reactor or in the axial reactor in the absence of the effective use of the choke in combination with the plug. Furthermore, these runs definitely indicate higher yields than those realized in Runs 4 and 5.

A comparison of Runs 4 and 5 indicates that the mere presence of the plug within the axial section, even withdrawn from the choke, under conditions of comparable photelometer and conversion, apparently so influences the flow in the reactor so as to affect the surface area and structure.

Various modifications can be made to the above-described apparatus without departing from the scope of this invention.

What is claimed is:

1. A carbon black reactor which comprises:
   a. a first reactor section adapted with conduit means for the introduction of reactants thereinto, one of said conduit means comprising a hydrocarbon feed inlet conduit and a sleeve positioned peripheral to and in spaced relationship to said inlet conduit to form an annulus therebetween, said sleeve and said inlet conduit being individually positionable along the longitudinal axis of said first section, said sleeve being adapted with apertures to provide open communication into said annulus;
   b. a choke positioned within said first section in contact relationship with the internal periphery of the wall of said first section to substantially prevent reactant flow between said wall and said choke, said choke having a centrally positioned bore;
   c. a plug positioned on said sleeve, said plug being removably positionable within said choke and in contact relationship with the internal periphery of said bore of said choke to substantially prevent reactant flow between said choke and said plug;
   d. a second reactor section in axial contiguous alignment with said first section and adapted to receive said reactants from said first section, said second reactor section being adapted with conduit means for the introduction of reactants through its outer periphery; and,
   e. a third reactor section in axial contiguous alignment with said second reactor section and adapted with conduit for the discharge of carbon black.

2. The carbon black reactor as defined in claim 1 in which said choke is adapted with an upstream-projecting lower portion and said plug is slidably positionable on said portion.

3. The carbon black reactor as defined in claim 1 in which said inlet conduit is positionable along the longitudinal axis of said first reactor section to discharge into said second reactor section.

4. The carbon black reactor as defined in claim 1 in which the downstream face of said choke is positionable in coinciding relationship with the upstream wall of said second reactor section.

5. The carbon black reactor as defined in claim 1 in which the downstream face of said plug is positionable in coinciding relationship with the downstream face of said choke.

* * * * *